(12) United States Patent
Kim

(10) Patent No.: US 11,386,000 B2
(45) Date of Patent: Jul. 12, 2022

(54) MEMORY SYSTEM, MEMORY CONTROLLER AND METHOD FOR OPERATING MEMORY SYSTEM IN WHICH DIFFERENT PROCESSORS SEARCH FOR MAPPING INFORMATION USING DIFFERENT MAP SEARCH ENGINES

(71) Applicant: SK hynix Inc., Gyeonggi-do (KR)

(72) Inventor: Kwang Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/011,338

(22) Filed: Sep. 3, 2020

(65) Prior Publication Data

US 2021/0334204 A1 Oct. 28, 2021

(30) Foreign Application Priority Data

Apr. 28, 2020 (KR) .................. 10-2020-0051150

(51) Int. Cl.
| | | |
|---|---|---|
| *G06F 12/02* | (2006.01) | |
| *G06F 12/084* | (2016.01) | |
| *G06F 13/16* | (2006.01) | |
| *G06F 12/06* | (2006.01) | |

(52) U.S. Cl.
CPC ...... *G06F 12/0246* (2013.01); *G06F 12/0646* (2013.01); *G06F 12/084* (2013.01); *G06F 13/1668* (2013.01); *G06F 2212/7201* (2013.01)

(58) Field of Classification Search
CPC ............. G06F 12/0246; G06F 13/1668; G06F 12/084; G06F 12/0646; G06F 2212/7201
See application file for complete search history.

(56) References Cited

U.S. PATENT DOCUMENTS 8,635,412 B1 * 1/2014 Wilshire ................. G06F 13/28 711/147
2020/0356491 A1 * 11/2020 Yen ...................... G06F 12/0866

FOREIGN PATENT DOCUMENTS

| KR | 10-2008-0075618 | 8/2008 |
| KR | 10-2017-0038853 | 4/2017 |

* cited by examiner

*Primary Examiner* — Tasnima Matin
(74) *Attorney, Agent, or Firm* — IP & T Group LLP

(57) ABSTRACT

A memory system, a memory controller, and an operating method therefor. The memory system includes a first processor configured to determine a processor, among multiple processor including the first processor, to process read operations on logical addresses indicated by read commands, and process a write operation on a logical address indicated by a write command; and a second processor, among the multiple processors, configured to process a read operation on a target logical address selected by the first processor among the logical addresses. The first processor searches for mapping information on a logical address corresponding to a read or write operation to be processed by the first processor, by using a first map search engine, and the second processor searches for mapping information on the target logical address by using a second map search engine. It is possible to improve the performance of searching for mapping information in a read operation.

20 Claims, 14 Drawing Sheets

MEMORY SYSTEM, MEMORY CONTROLLER AND METHOD FOR OPERATING MEMORY SYSTEM IN WHICH DIFFERENT PROCESSORS SEARCH FOR MAPPING INFORMATION USING DIFFERENT MAP SEARCH ENGINES

CROSS-REFERENCE TO RELATED APPLICATION

The present application claims priority under 35 U.S.C. § 119(a) to Korean Patent Application No. 10-2020-0051150, filed in the Korean Intellectual Property Office on Apr. 28, 2020, which is incorporated herein by reference in its entirety.

BACKGROUND

1. Technical Field

Various embodiments generally relate to a memory system, a memory controller and a method for operating the memory system.

2. Related Art

A memory system, e.g., a storage device stores data on the basis of a request from a host, such as a computer, a mobile terminal (for example, a smartphone or a tablet), or any of various other electronic devices. The memory system may be of the type that stores data in a magnetic disk such as a hard disk drive (HDD), or of the type that stores data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

When a memory system performs a read or write operation based on a command received from a host, the memory system searches a mapping table or map cache for mapping information between a logical address (LA) of a memory transmitted from the host and a physical address (PA) of a memory device. The more time it takes for firmware to process the command and search for the mapping information, the more the performance of the memory system is degraded.

SUMMARY

Various embodiments are directed to a memory system, a memory controller and a method for operating the memory system, capable of improving the performance of searching for mapping information in a read operation.

In one aspect, embodiments of the disclosure may provide a memory system including: a memory device; and a memory controller configured to control the memory device.

The memory controller may include a first processor configured to determine a processor, among multiple processors including the first processor, to process read operations on logical addresses indicated by read commands, and process a write operation on a logical address indicated by a write command.

Further, the memory controller may include a second processor, among the multiple processors, configured to process a read operation on a target logical address selected by the first processor among the logical addresses indicated by the read commands.

The first processor may search for mapping information on a logical address corresponding to a read operation or a write operation to be processed by the first processor, by using a first map search engine, and the second processor may search for mapping information on the target logical address by using a second map search engine.

The target logical address may be 1) an odd logical address, 2) an even logical address, or 3) a logical address indicated by a target read command selected by the first processor among the read commands.

The first processor may process a read operation on a remaining logical address other than the target logical address. Alternatively, the memory controller may further include a third processor, among the multiple processors, configured to process a read operation on a remaining logical address other than the target logical address.

When the second processor does not search for the mapping information on the target logical address, the second processor may request the first processor to load the mapping information on the target logical address. The first processor may load the mapping information on the target logical address from the memory device, and thereafter, may transmit the mapping information on the target logical address to the second processor.

The first processor may process a background operation for the memory device.

In another aspect, embodiments of the disclosure may provide a memory controller including: a memory interface configured to communicate with a memory device; and a control circuit configured to control the memory device.

The control circuit may include a first processor configured to determine a processor, among multiple processors including the first processor, to process read operations on logical addresses indicated by read commands, and process a write operation on a logical address indicated by a write command.

Further, the control circuit may include a second processor, among the multiple processors, configured to process a read operation on a target logical address selected by the first processor among the logical addresses indicated by the read commands.

The first processor may search for mapping information on a logical address corresponding to a read operation or a write operation to be processed by the first processor, by using a first map search engine, and the second processor may search for mapping information on the target logical address by using a second map search engine.

The target logical address may be 1) an odd logical address, 2) an even logical address, or 3) a logical address indicated by a target read command selected by the first processor among the read commands.

The first processor may process a read operation on a remaining logical address other than the target logical address. Alternatively, the control circuit may further include a third processor, among the multiple processors, configured to process a read operation on a remaining logical address other than the target logical address.

When the second processor does not search for the mapping information on the target logical address, the second processor may request the first processor to load the mapping information on the target logical address. The first processor may load the mapping information on the target logical address from the memory device, and thereafter, may transmit the mapping information on the target logical address to the second processor.

The first processor may process a background operation for the memory device.

In still another aspect, a method for operating a memory system may include determining, by a first processor, a processor, among multiple processors including the first processor, to process read operations on logical addresses indicated by read commands.

The method may include processing, by the first processor, a write operation on a logical address indicated by a write command.

The method may include selecting, by the first processor, a target logical address among the logical addresses indicated by the read commands.

The method may include processing, by a second processor among the multiple processors, a read operation on the target logical address.

The method may include searching, by the first processor, for mapping information on a logical address corresponding to a read operation or a write operation to be processed by the first processor, by using a first map search engine. The method may include searching, by the second processor, for mapping information on the target logical address by using a second map search engine.

The target logical address may be 1) an odd logical address, 2) an even logical address, or 3) a logical address indicated by a target read command selected by the first processor among the read commands.

The method may further include processing, by the first processor, a read operation on a remaining logical address other than the target logical address, or include processing, by a third processor, a read operation on a remaining logical address other than the target logical address.

When the second processor does not search for the mapping information on the target logical address, the method may include requesting, by the second processor, the first processor to load the mapping information on the target logical address. The method may further include loading, by the first processor, the mapping information on the target logical address from the memory device, and thereafter, transmitting, by the first processor, the mapping information on the target logical address to the second processor.

The method may include processing, by the first processor, a background operation for the memory device.

In still another aspect, embodiments of the disclosure may provide a controller including: a map cache configured to cache map data of logical addresses and respectively corresponding physical addresses.

The controller may include first and second operation control components configured to separately control a memory device to perform operations by respectively translating first and second groups of logical addresses into corresponding physical addresses cached in the map cache.

The first operation control component may be configured to cache further map data from the memory device into the map cache in case of a cache-miss of the map cache.

According to the embodiments of the disclosure, it is possible to improve the performance of searching for mapping information in a read operation.

DETAILED DESCRIPTION

Hereinafter, embodiments of the present invention disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
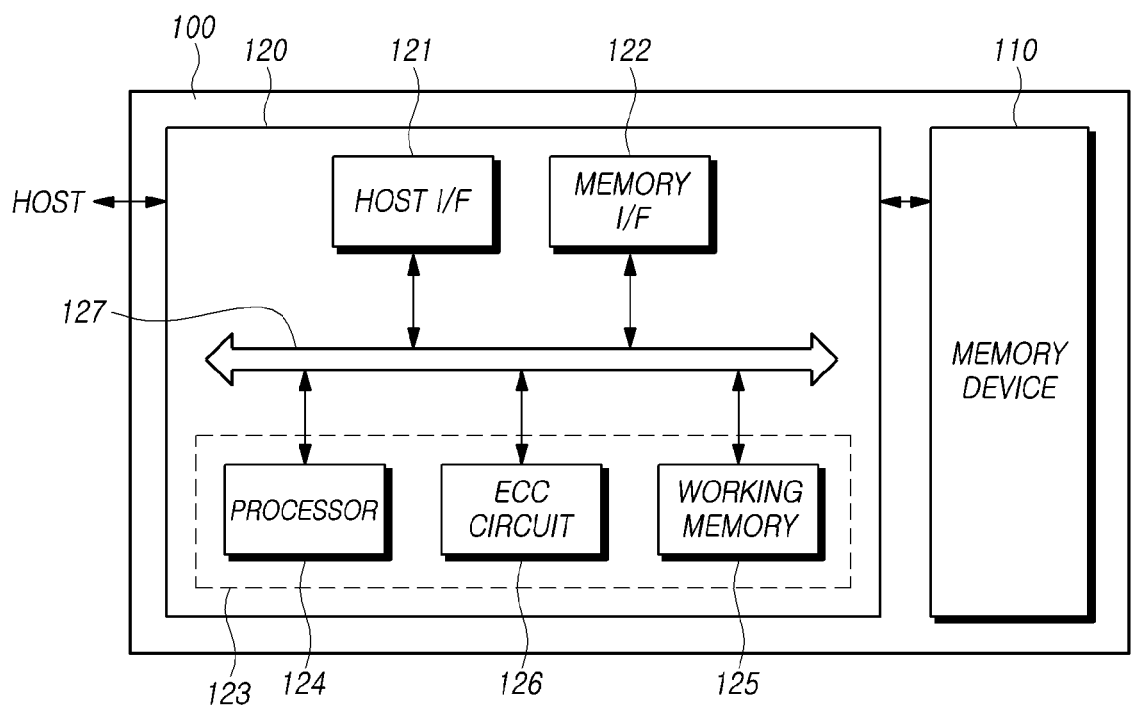
FIG. 1 is a schematic diagram illustrating a configuration of a memory system according to an embodiment of the present invention disclosure.

FIG. 1 is a diagram illustrating the schematic configuration of a memory system 100 according to an embodiment of the present invention disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Embodiments of the present invention disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation, an erasure operation, and the like. During the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In another embodiment, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for overall control of the memory controller 120. For example, the control circuit 123 may include a processor 124 and a working memory 125. The control circuit 123 may further include an error detection/correction circuit (ECC circuit) 126 and the like.

The processor 124 may control overall operation of the memory controller 120. The processor 124 may perform a logical operation. The processor 124 may communicate with the host (HOST) through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) so as to control the operation of the memory controller 120. In other words, the processor 124 may control overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include a flash translation layer (FTL) configured to translate between a logical address that the host requests the memory system 100 to provide and a physical address of the memory device 110, a host interface layer (HIL) configured to interpret a command that the host issues to the memory system 100 (storage device) and to deliver the same to the FTL, and/or a flash interface layer (FIL) configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may be implemented as a volatile memory with a static RAM (SRAM), a dynamic RAM (DRAM), and/or a synchronous RAM (SDRAM).

The error detection/correction circuit 126 may be configured to detect error bit(s) of target data by using an error correction code, and to correct the detected error bit(s). For example, the target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect error bit(s), sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector included in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. One or more of these constituent elements 121, 122, 124, 125, and 126 may be omitted, and/or one or more of these constituent elements may be integrated into a single element. Also, in some cases, one or more other constituent elements may be added, in addition to the above-mentioned constituent elements of the memory controller 120.

Hereinafter, the memory device 110 are described in more detail with reference to FIG. 2.

Figure 2:
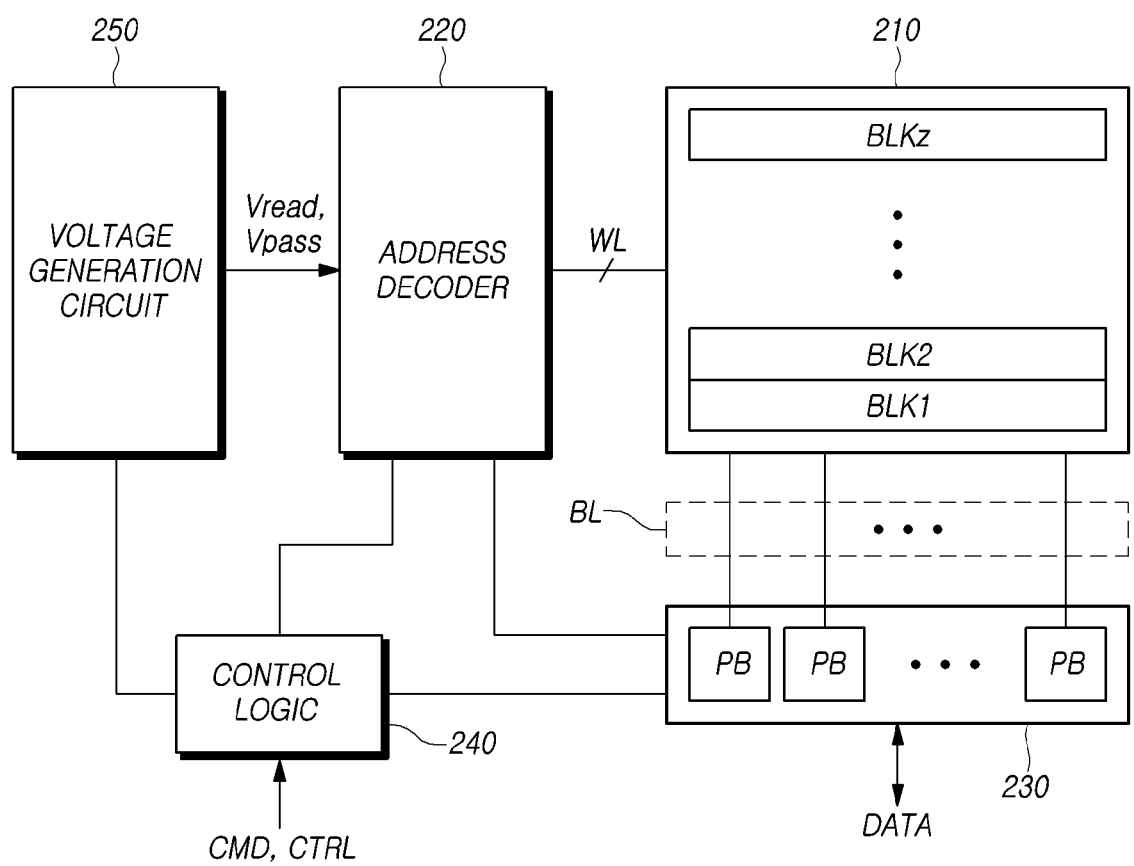
FIG. 2 is a block diagram schematically illustrating a memory device according to an embodiment of the present invention disclosure.

FIG. 2 is a block diagram schematically illustrating a memory device 110 according to an embodiment of the present invention disclosure.

Referring to FIG. 2, the memory device 110 may include a memory cell array 210, an address decoder 220, a read/write circuit 230, a control logic 240, and a voltage generation circuit 250.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed, and multiple memory cells MC may be arranged at respective intersections thereof.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, which may have a vertical channel structure.

The memory cell array 210 may be configured as a memory cell array having a two-dimensional structure and, in some cases, may be configured as a memory cell array having a three-dimensional structure.

Each of the multiple memory cells included in the memory cell array 210 may store at least one bit of data. For example, each of the multiple memory cells in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

Referring to FIG. 2, the address decoder 220, the read/write circuit 230, the control logic 240, and the voltage generation circuit 250 may collectively operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

The address decoder 250 may apply the read voltage Vread to a selected word line WL inside a selected memory block, during an operation of applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include a block address, a row address, and/or a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that is in charge of a data processing function and, in some cases, may further include a cache buffer to perform a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
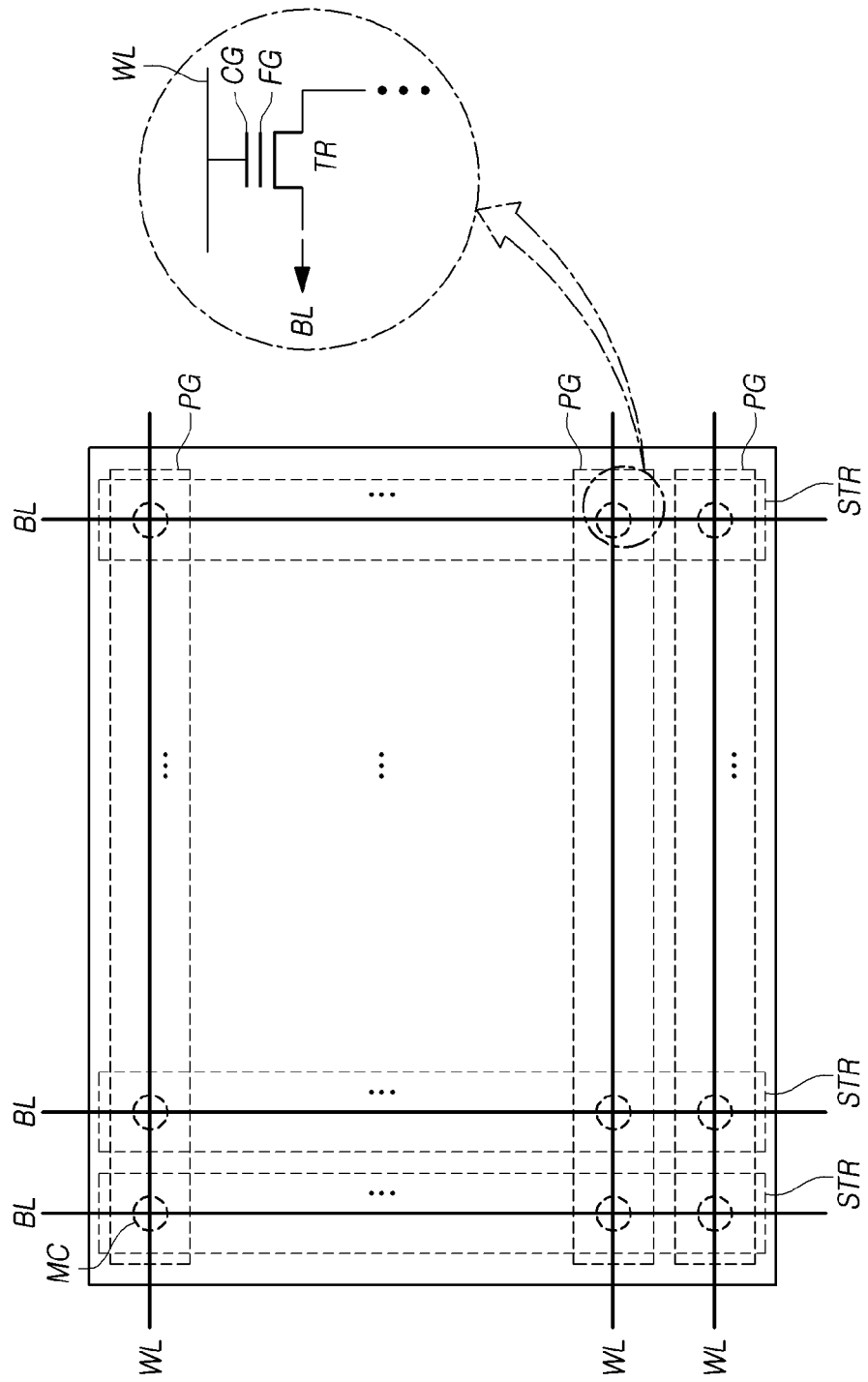
FIG. 3 is a diagram schematically illustrating a memory block of a memory device according to an embodiment of the present invention disclosure.

FIG. 3 is a diagram schematically illustrating a memory block BLK of a memory device 110 according to an embodiment of the present invention disclosure.

Referring to FIG. 3, a memory block BLK included in the memory device 110 may be arranged and configured such that multiple pages PG and multiple strings TTR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (write operation) may be performed page by page, and an erasure operation may be performed memory block by memory block.

Figure 4:
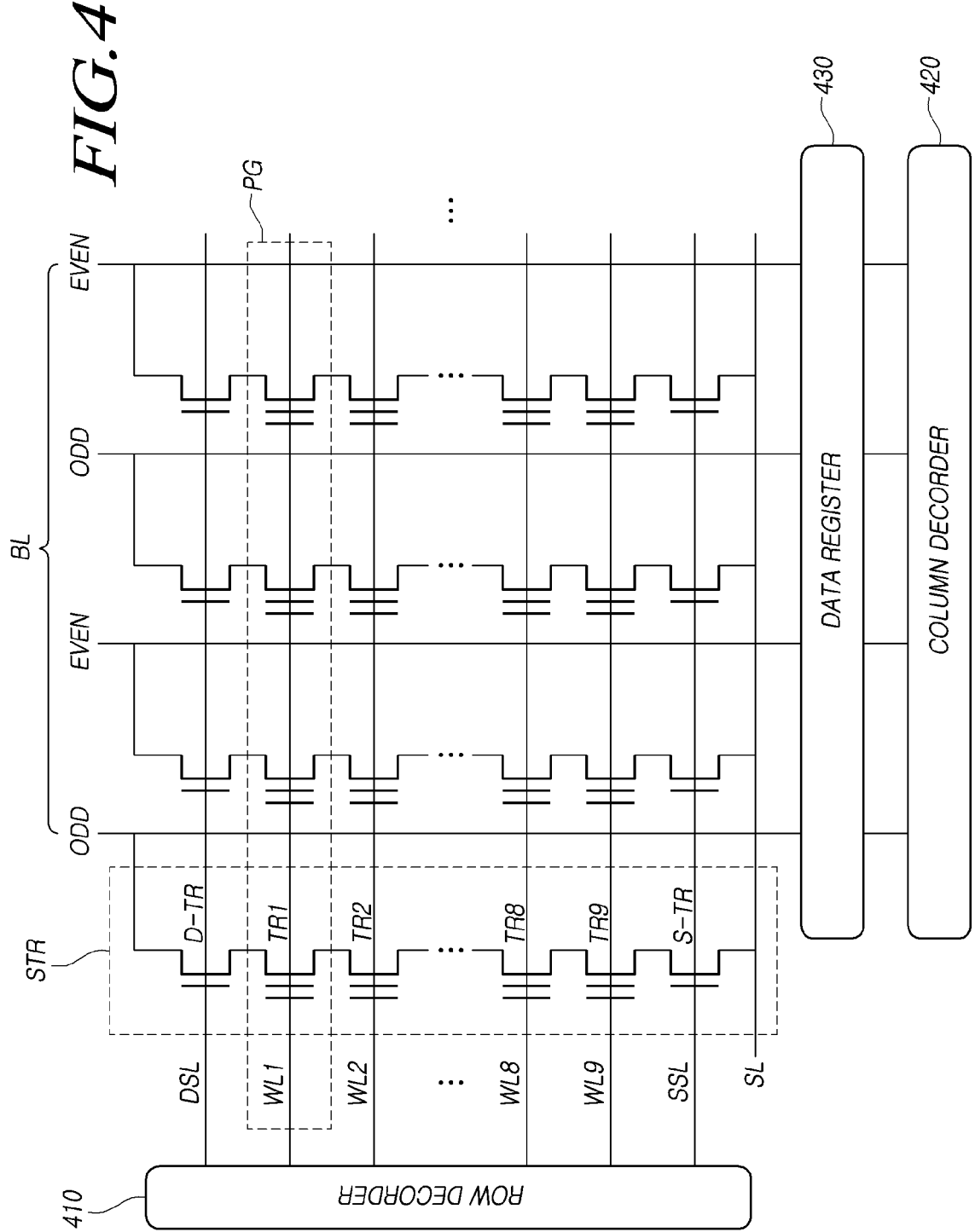
FIG. 4 is a diagram illustrating a structure of word lines and bit lines of a memory device according to an embodiment of the present invention disclosure.

FIG. 4 is a diagram illustrating a structure of word lines WL and bit lines BL of a memory device 110 according to an embodiment of the present invention disclosure.

Referring to FIG. 4, the memory device 110 has a core area in which memory cells MC are concentrated, and an auxiliary area which corresponds to the remaining area, i.e., the non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit on which a program operation and a read operation is conducted, and all memory cells MC within the same page PG may perform simultaneous operations when conducting a program operation and a read operation.

The multiple bit lines BL may be connected to the column decoder 420 while being distinguished between odd-numbered bit lines BL and even-numbered bit lines BL.

For accessing a memory cell MC, the address may be delivered to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in a position further down the line in the direction of voltage application among memory cells MC connected in series may slightly differ from the voltage applied to a memory cell MC up the line, due to voltage drop across the memory cells MC.

The data register 430 plays an important role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade the overall performance of the memory device 110.

Referring to the example illustrated in FIG. 4, in one string STR, multiple transistors TR1-TR9 connected to multiple word lines WL1-WL9 may exist. The areas in which the multiple transistor TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned at opposite ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
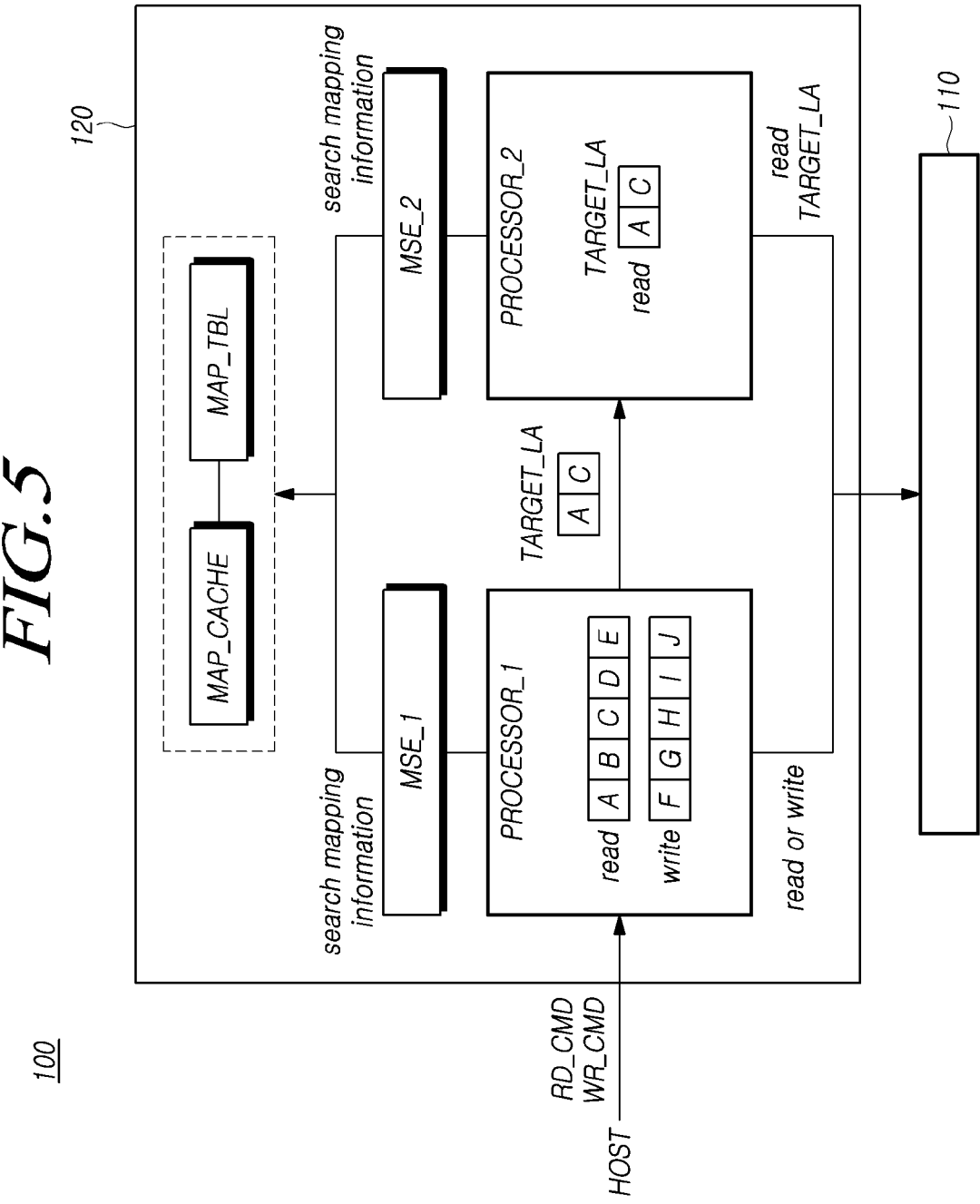
FIG. 5 is a diagram illustrating a schematic operation of a memory system in accordance with an embodiment of the disclosure.

FIG. 5 is a diagram illustrating a schematic operation of a memory system 100 in accordance with an embodiment of the disclosure.

Referring to FIG. 5, a memory controller 120 of the memory system 100 may include a first processor PROCESSOR_1 and a second processor PROCESSOR_2. Each of the first processor PROCESSOR_1 and the second processor PROCESSOR_2 may be the processor 124 described above with reference to FIG. 1, a sub processor included in the processor 124, or an external processor existing separately from the processor 124.

The first processor PROCESSOR_1 may determine a processor to process a read operation on a logical address indicated by a read command RD_CMD, and may process a write operation on a logical address indicated by a write command WR_CMD.

That is to say, the first processor PROCESSOR_1 may determine whether the first processor PROCESSOR_1 or another processor, e.g., the second processor PROCESSOR_2, will process the read operation on the logical address indicated by the read command RD_CMD. On the other hand, the first processor PROCESSOR_1 processes the write operation on the logical address indicated by the write command WR_CMD, and does not control another processor to process it.

The memory controller 120 of the memory system 100 may receive the read command RD_CMD and the write command WR_CMD from a host HOST. The operation of receiving the read command RD_CMD and the write command WR_CMD from the host may be processed by the first processor PROCESSOR_1, or may be processed by a different processor, e.g., the second processor PROCESSOR_2.

In FIG. 5, the first processor PROCESSOR_1 may determine a processor to process read operations on logical addresses A, B, C, D and E, which are arbitrary logical address values, indicated by read commands RD_CMD. The first processor PROCESSOR_1 may process write operations on logical addresses F, G, H, I and J, which are also arbitrary logical address values.

The first processor PROCESSOR_1 may process all the read operations on the logical addresses A, B, C, D and E, or may control the read operations on some of the logical addresses A, B, C, D and E to be processed through the separate second processor PROCESSOR_2.

For instance, the second processor PROCESSOR_2 may process a read operation on a target logical address TARGET_LA selected by the first processor PROCESSOR_1 among logical addresses indicated by read commands RD_CMD.

Each of the first processor PROCESSOR_1 and the second processor PROCESSOR_2 may directly access a memory device 110 to process a read operation and a write operation, or one of these processors may access the other processor which controls an operation for the memory device 110.

In FIG. 5, it is assumed that the first processor PROCESSOR_1 has selected the logical addresses A and C as target logical addresses TARGET_LA. In this case, the first processor PROCESSOR_1 may transmit information on the logical addresses A and C as the target logical addresses TARGET_LA to the second processor PROCESSOR_2 to control the second processor PROCESSOR_2 to process the read operations on the logical addresses A and C as the target logical addresses TARGET_LA.

The first processor PROCESSOR_1 and the second processor PROCESSOR_2 may separately use map search engines for searching for mapping information on logical addresses. Mapping information on a logical address may indicate information on a physical address which is mapped to the corresponding logical address.

In detail, the first processor PROCESSOR_1 may search for mapping information on logical addresses, corresponding to a read operation and a write operation on logical addresses (LA) indicated by commands CMD received from the host, by using a first map search engine MSE_1.

The second processor PROCESSOR_2 may search for mapping information on the target logical address(es) TARGET_LA, by using a second map search engine MSE_2.

The first map search engine MSE_1 and the second map search engine MSE_2 may check whether mapping information on logical addresses to search for exists, in a map cache MAP_CACHE or a mapping table MAP_TBL. The first map search engine MSE_1 and the second map search engine MSE_2 may refer to the same map cache MAP_CACHE or mapping table MAP_TBL to check the mapping information on the logical addresses to search for.

The mapping table MAP_TBL may include mapping information between logical addresses and physical addresses, and may be positioned in the working memory 125 of the memory controller 120. The mapping table MAP_TBL may be loaded from the memory device 110 when the memory system 100 is booted.

The map cache MAP_CACHE may cache all or some of the mapping information between the logical addresses and the physical addresses included in the mapping table MAP_TBL. The map cache MAP_CACHE may be disposed in the working memory 125 of the memory controller 120 like the mapping table MAP_TBL, or may be disposed in a separate volatile memory (e.g., a TCM, an SRAM, a DRAM or an SDRAM) different from the working memory 125.

The first map search engine MSE_1 and the second map search engine MSE_2 first check whether mapping information corresponding to logical addresses to search for is cached in the map cache MAP_CACHE. If the mapping information corresponding to the logical addresses to search for is cached in the map cache MAP_CACHE, the first map search engine MSE_1 and the second map search engine MSE_2 end the search. Conversely, if the mapping information corresponding to the logical addresses to search for is not cached in the map cache MAP_CACHE, the first map search engine MSE_1 and the second map search engine MSE_2 search the mapping table MAP_TBL for the mapping information corresponding to the logical addresses.

As such, by using two different processors, e.g., the first processor PROCESSOR_1 and the second processor PROCESSOR_2, to process in parallel a read operation and a write operation on logical addresses, the memory system 100 may improve the performance of processing both operations, as compared to when one processor sequentially processes the read operation and the write operation.

Also, by allowing the first processor PROCESSOR_1 and the second processor PROCESSOR_2 to search for mapping information on logical addresses by using separate map search engines, the memory system 100 may improve the performance of searching for the mapping information in a read operation or a write operation, as compared to when one map search engine is used.

Hereinafter, examples as to which logical address among logical addresses indicated by read commands RD_CMD the first processor PROCESSOR_1 selects as the target logical address TARGET_LA to be processed by the second processor PROCESSOR_2 are described with reference to FIGS. 6 to 8.

For example, the target logical address TARGET_LA may be 1) an odd logical address, 2) an even logical address or 3) a logical address indicated by a target read command selected by the first processor PROCESSOR_1 among the read commands RD_CMD.

Figure 6:
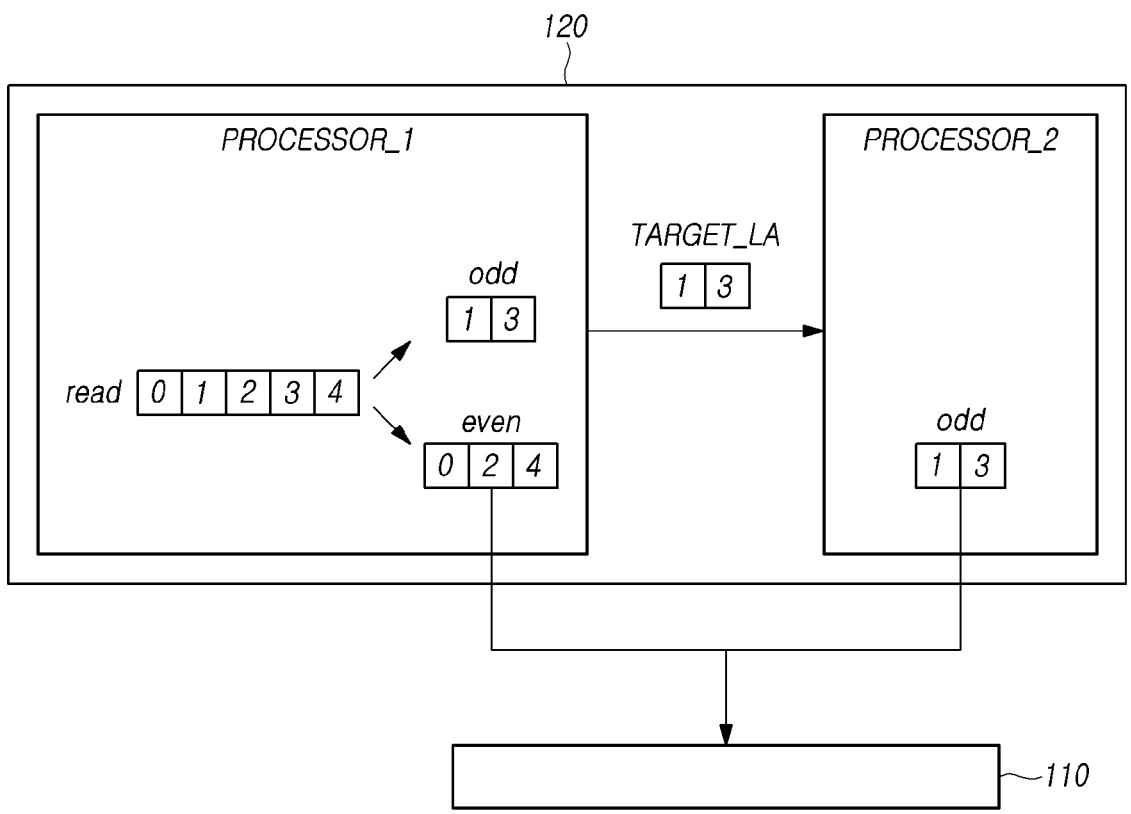
FIG. 6 is a diagram illustrating operations of a first processor and a second processor in accordance with an embodiment of the disclosure.

FIG. 6 is a diagram illustrating operations of a first processor PROCESSOR_1 and a second processor PROCESSOR_2 in accordance with an embodiment of the disclosure.

In FIG. 6, the first processor PROCESSOR_1 may select odd logical addresses 1 and 3 among logical addresses 0, 1, 2, 3 and 4 as target logical addresses TARGET_LA, and may transmit information on the target logical addresses TARGET_LA to the second processor PROCESSOR_2 to allow the second processor PROCESSOR_2 to process read operations on the target logical addresses TARGET_LA.

The second processor PROCESSOR_2 may receive the information on the logical addresses 1 and 3 as odd target logical addresses TARGET_LA from the first processor PROCESSOR_1, and may process the read operations on the logical addresses 1 and 3 as odd target logical addresses TARGET_LA.

The first processor PROCESSOR_1 may process read operations on the remaining logical addresses 0, 2 and 4 as even target logical addresses TARGET_LA among the logical addresses 0, 1, 2, 3 and 4.

Figure 7:
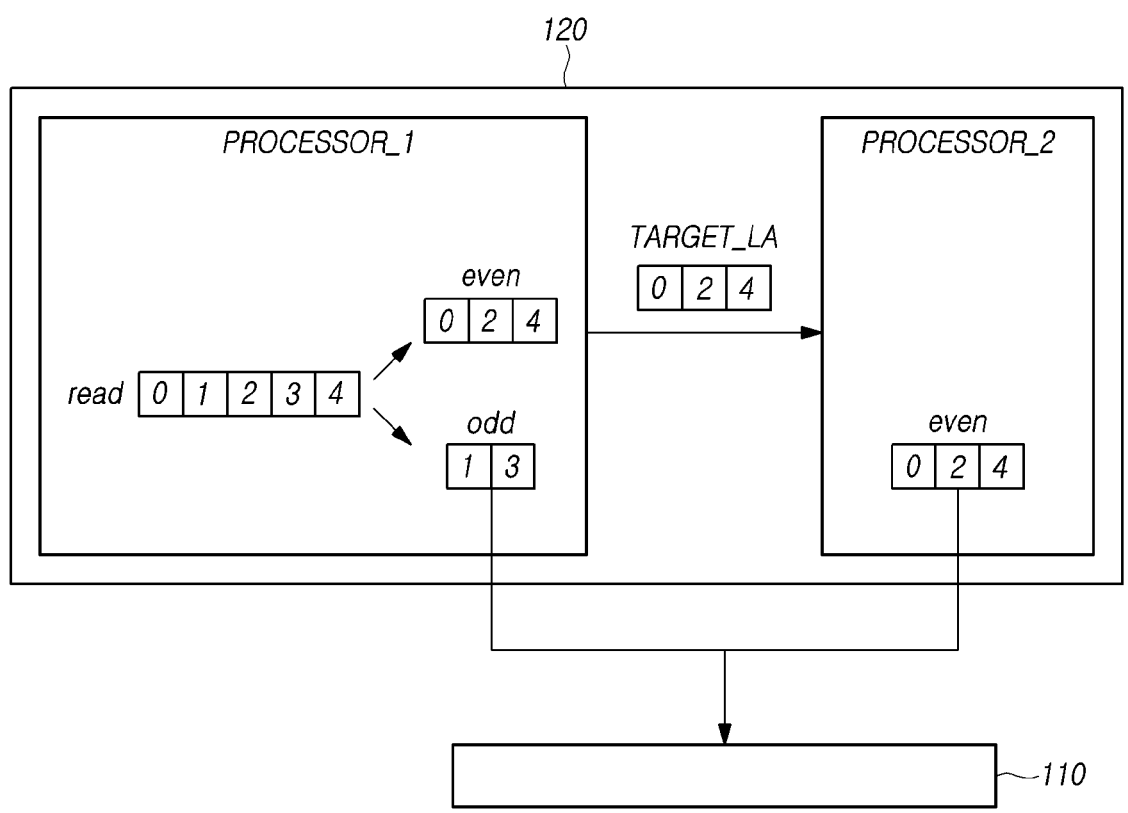
FIG. 7 is a diagram illustrating operations of a first processor and a second processor in accordance with another embodiment of the disclosure.

FIG. 7 is a diagram illustrating operations of a first processor PROCESSOR_1 and a second processor PROCESSOR_2 in accordance with another embodiment of the disclosure.

In FIG. 7, the first processor PROCESSOR_1 may select even logical addresses 0, 2 and 4 among logical addresses 0, 1, 2, 3 and 4 as target logical addresses TARGET_LA, and may transmit information on the even target logical addresses TARGET_LA to the second processor PROCESSOR_2 to allow the second processor PROCESSOR_2 to process read operations on the even target logical addresses TARGET_LA.

The second processor PROCESSOR_2 may receive the information on the logical addresses 0, 2 and 4 as the even target logical addresses TARGET_LA from the first processor PROCESSOR_1, and may process the read operations on those logical addresses.

The first processor PROCESSOR_1 may process read operations on the remaining, i.e., odd, logical addresses 1 and 3 as the odd target logical addresses TARGET_LA among the logical addresses 0, 1, 2, 3 and 4.

Figure 8:
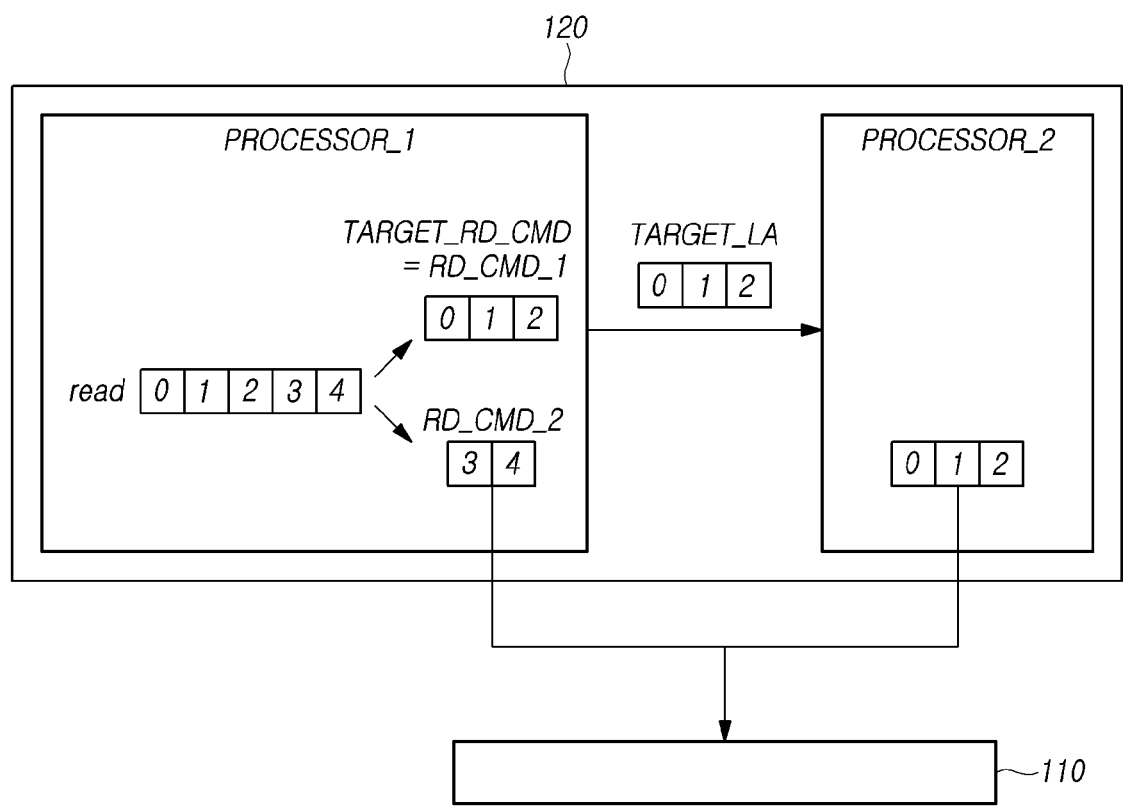
FIG. 8 is a diagram illustrating operations of a first processor and a second processor in accordance with still another embodiment of the disclosure.

FIG. 8 is a diagram illustrating operations of a first processor PROCESSOR_1 and a second processor PROCESSOR_2 in accordance with still another embodiment of the disclosure.

In FIG. 8, it is assumed that logical addresses indicated by a first read command RD_CMD_1 of read commands RD_CMD are 0, 1 and 2 and logical addresses indicated by a second read command RD_CMD_2 are 3 and 4. Further, it is assumed that the first processor PROCESSOR_1 has selected the first read command RD_CMD_1 as a target read command TARGET_RD_CMD.

The first processor PROCESSOR_1 may select the logical addresses 0, 1 and 2 indicated by the first read command RD_CMD_1 as the target read command TARGET_RD_CMD, as first target logical addresses TARGET_LA.

The second processor PROCESSOR_2 may receive information on the logical addresses 0, 1 and 2 as the first target logical addresses TARGET_LA from the first processor PROCESSOR_1, and may process read operations on these logical addresses.

The first processor PROCESSOR_1 may process read operations on the remaining logical addresses 3 and 4 as the second target logical addresses TARGET_LA among the logical addresses 0, 1, 2, 3 and 4.

With reference to FIGS. 6 to 8, a case where the first processor PROCESSOR_1 processes read operations on remaining logical addresses other than those to be processed by the second processor PROCESSOR_2 was described.

However, the first processor PROCESSOR_1 may control another processor (e.g. third processor PROCESSOR_3) to process read operations on remaining logical addresses. Hereinafter, this is described in detail with reference to FIG. 9.

Figure 9:
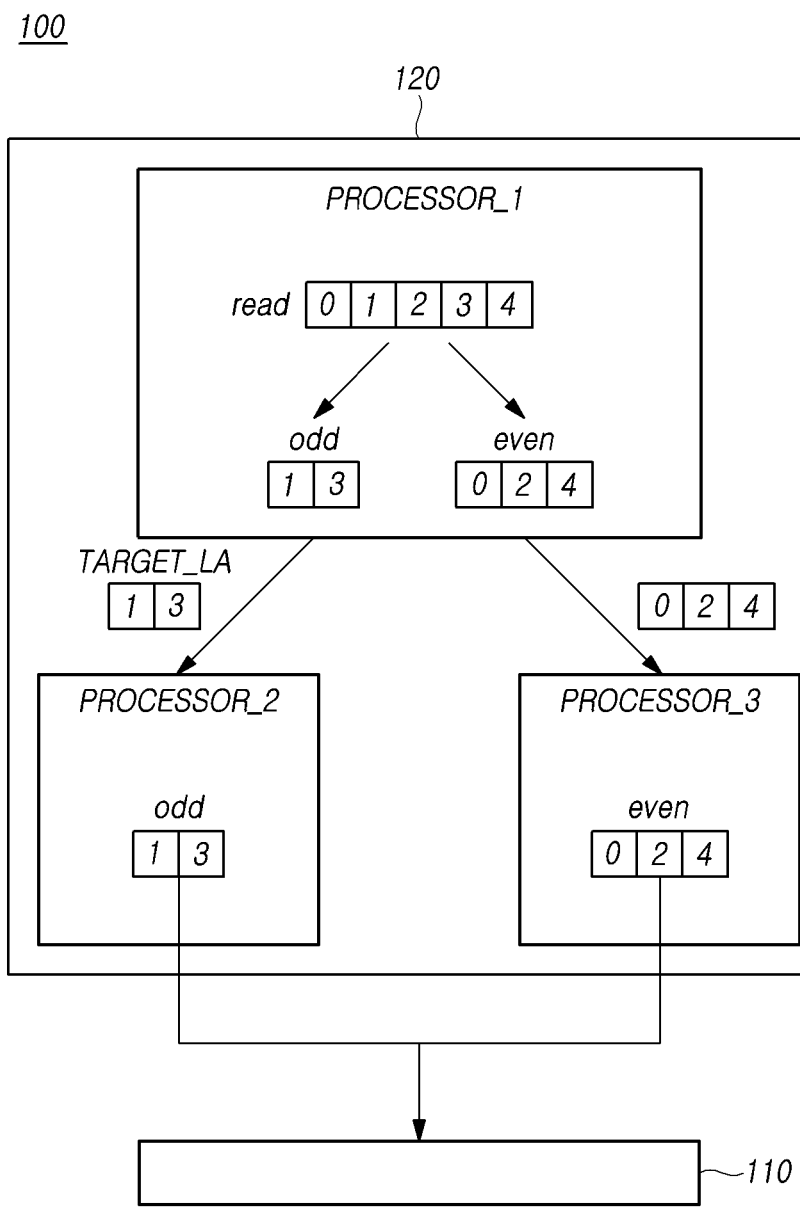
FIG. 9 is a diagram illustrating operations of a first processor, a second processor and a third processor in accordance with an embodiment of the disclosure.

FIG. 9 is a diagram illustrating operations of the first processor PROCESSOR_1, the second processor PROCESSOR_2 and a third processor PROCESSOR_3 in accordance with an embodiment of the disclosure.

Referring to FIG. 9, the memory controller 120 of the memory system 100 may further include the third processor PROCESSOR_3 which processes a read operation on a remaining logical address other than the target logical address(es) TARGET_LA selected by the first processor PROCESSOR_1. Like the first processor PROCESSOR_1 and the second processor PROCESSOR_2, the third processor PROCESSOR_3 may also be the processor 124 described above with reference to FIG. 1, a sub processor included in the processor 124, or an external processor existing separately from the processor 124.

It is assumed that the first processor PROCESSOR_1 has selected odd logical addresses 1 and 3 among logical addresses 0, 1, 2, 3 and 4 as odd target logical addresses TARGET_LA.

The second processor PROCESSOR_2 may receive information on the logical addresses 1 and 3 as the odd target logical addresses TARGET_LA from the first processor PROCESSOR_1, and may process read operations on these logical addresses.

The third processor PROCESSOR_3 may receive information on the remaining logical addresses 0, 2 and 4 as the even target logical addresses TARGET_LA from the first processor PROCESSOR_1, and may process read operations on the logical addresses 0, 2 and 4.

In other words, in FIG. 9, the first processor PROCESSOR_1 may not process a read operation, and may control the second processor PROCESSOR_2 or the third processor PROCESSOR_3 to process the read operation.

While FIG. 9 illustrates only a case where the target logical address TARGET_LA is an odd logical address, the same method may be applied when the target logical addresses TARGET_LA are selected in a different way.

Hereinabove, examples as to which logical address(es) among logical addresses indicated by read commands RD_CMD the first processor PROCESSOR_1 selects as target logical address(es) TARGET_LA to be processed by the second processor PROCESSOR_2 were described with reference to FIGS. 6 to 8.

Hereinafter, an operation in which the second processor PROCESSOR_2 searches for mapping information on target logical address(es) TARGET_LA received from the first processor PROCESSOR_1, so as to process a read operation on the target logical address(es) TARGET_LA is described.

Figure 10:
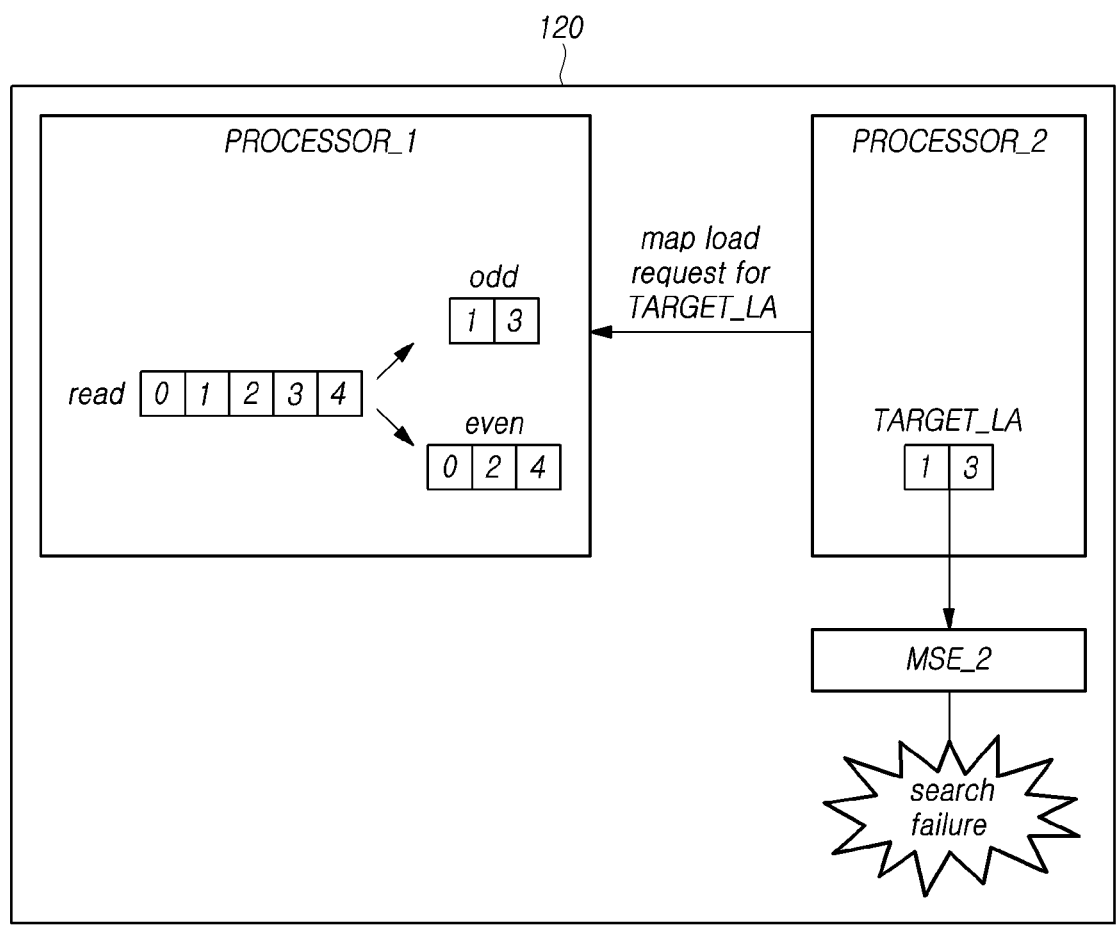
FIG. 10 is a diagram illustrating an operation in which a second processor in accordance with an embodiment of the disclosure searches for mapping information.

FIG. 10 is a diagram illustrating an operation in which a second processor PROCESSOR_2 in accordance with an embodiment of the disclosure searches for mapping information.

Referring to FIG. 10, the second processor PROCESSOR_2 may search for mapping information on logical addresses 1 and 3 as odd target logical addresses TARGET_LA by using the above-described second map search engine MSE_2, so as to process read operations on these logical addresses.

The second processor PROCESSOR_2 may not search for the mapping information on the odd target logical addresses TARGET_LA. While the second map search engine MSE_2 searches for the mapping information on the odd target logical addresses TARGET_LA in the map cache MAP_CACHE or the mapping table MAP_TBL as described above with reference to FIG. 5, neither the map cache MAP_CACHE nor the mapping table MAP_TBL may include the mapping information on the odd target logical addresses TARGET_LA.

At this time, the second processor PROCESSOR_2 may request the first processor PROCESSOR_1 to load the mapping information on the odd target logical addresses TARGET_LA, instead of directly loading the mapping information on these target logical addresses TARGET_LA, from the memory device 110.

Figure 11:
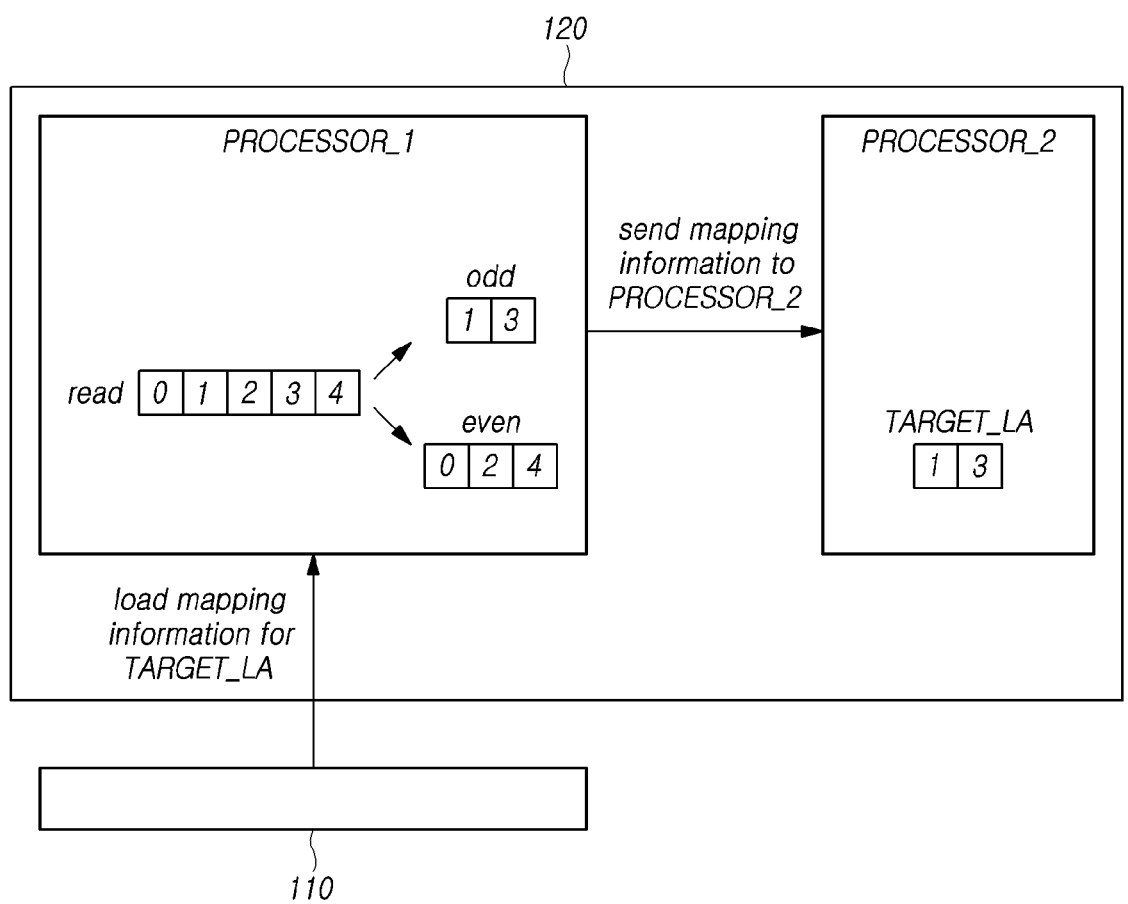
FIG. 11 is a diagram illustrating an operation in which a first processor loads the mapping information from a memory device, such as that in FIG. 10.

FIG. 11 is a diagram illustrating an operation in which the first processor PROCESSOR_1 loads the mapping information from the memory device 110 in FIG. 10.

Referring to FIG. 11, the first processor PROCESSOR_1 may receive the request of the second processor PROCESSOR_2, and may load the mapping information on the odd target logical addresses TARGET_LA from the memory device 110.

After loading the mapping information on the odd target logical addresses TARGET_LA from the memory device 110, the first processor PROCESSOR_1 may transmit the mapping information on the odd target logical addresses TARGET_LA to the second processor PROCESSOR_2. And the mapping information on the odd target logical address TARGET_LA may be cached to the map cache MAP_CACHE by the first processor PROCESSOR_1.

While FIGS. 10 and 11 illustrate only a case where the target logical addresses TARGET_LA are odd logical addresses, the same method may be applied when the target logical addresses TARGET_LA are selected in a different way.

Figure 12:
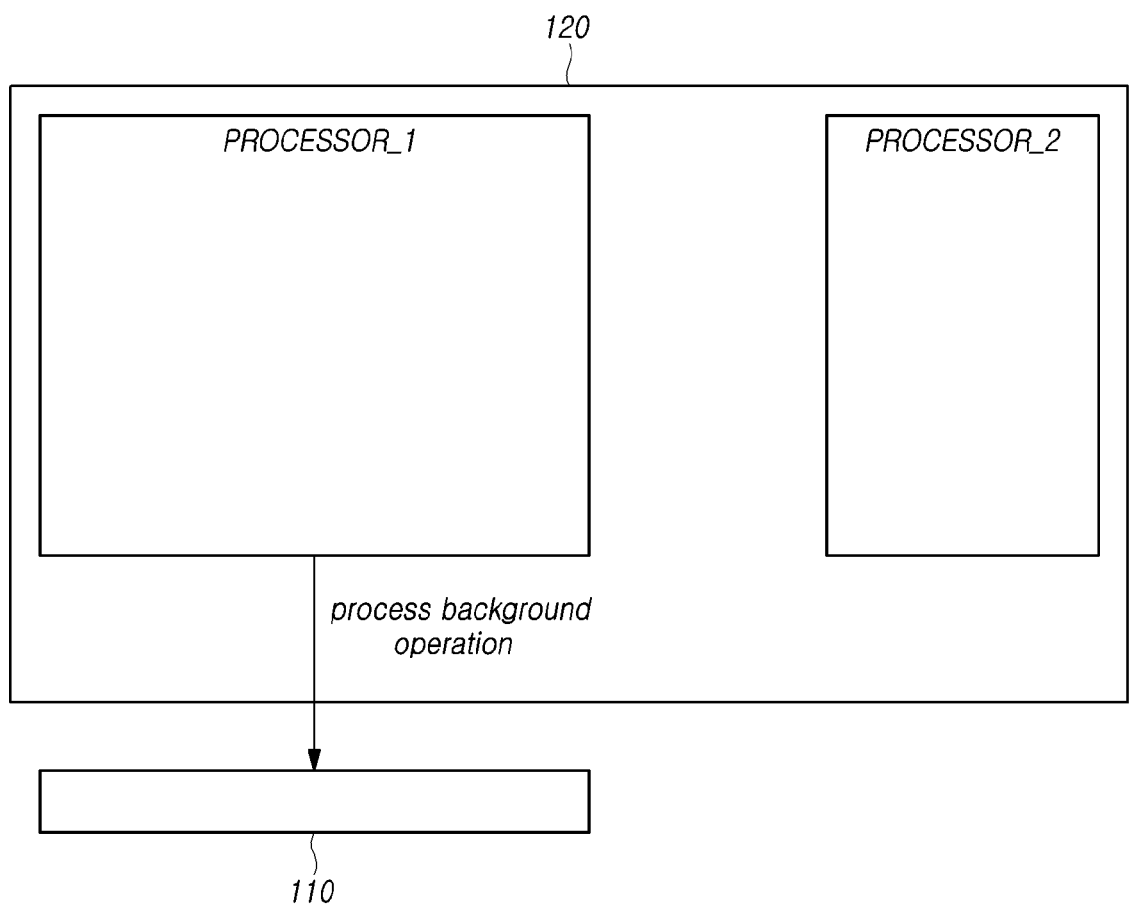
FIG. 12 is a diagram illustrating an operation in which a first processor processes a background operation for a memory device, in accordance with an embodiment of the disclosure.

FIG. 12 is a diagram illustrating an operation in which the first processor PROCESSOR_1 processes a background operation for the memory device 110, in accordance with an embodiment of the disclosure.

Referring to FIG. 12, the first processor PROCESSOR_1 may process a background operation (e.g., GC/WL/RR) for the memory device 110. Namely, both a write operation and a background operation may be processed by the first processor PROCESSOR_1.

Figure 13:
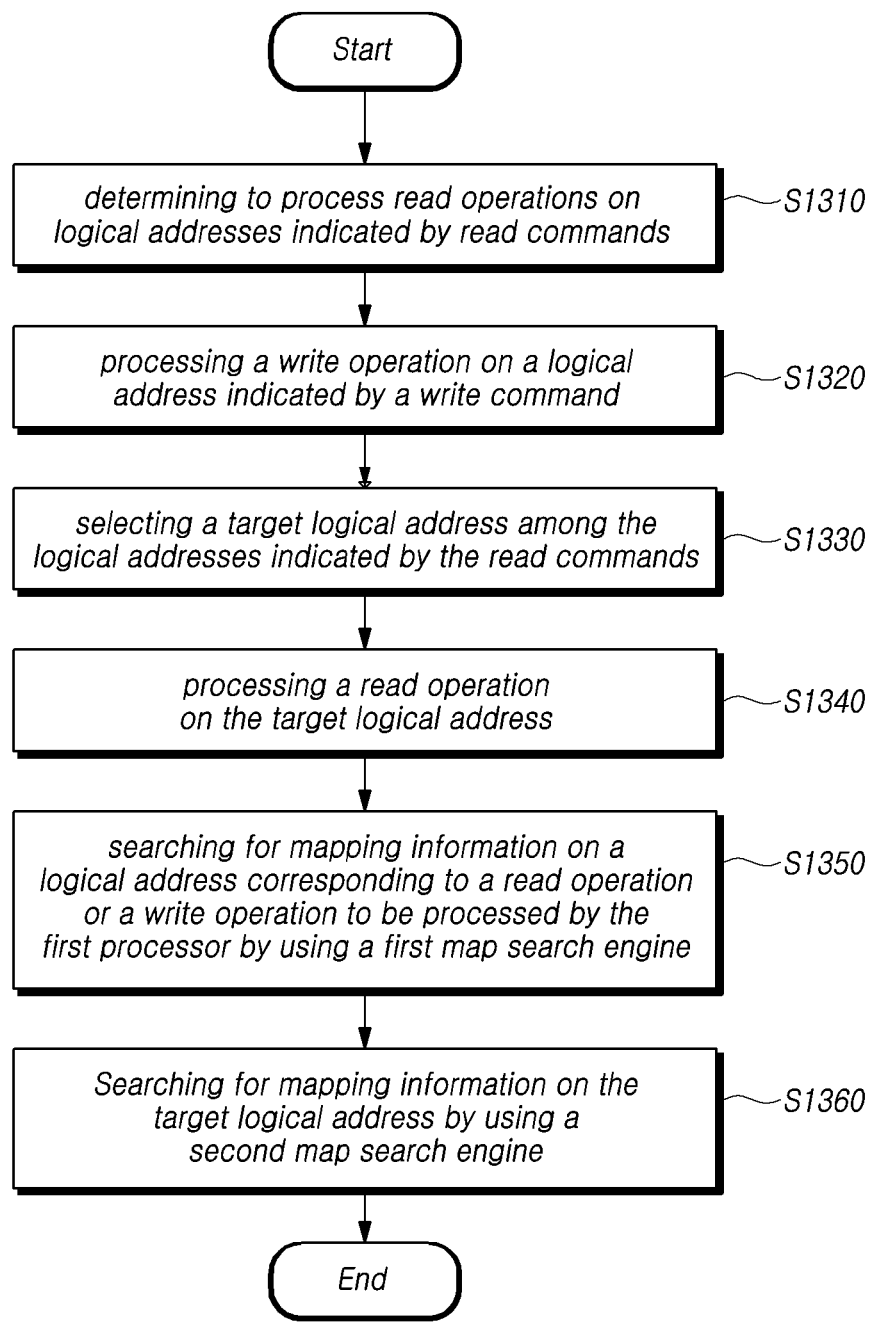
FIG. 13 is a flow chart to assist in the explanation of a method for operating a memory system in accordance with an embodiment of the disclosure.

FIG. 13 is a flow chart to assist in the explanation of a method for operating the memory system 100 in accordance with an embodiment of the disclosure.

First, the method for operating the memory system 100 may include step S1310 in which the first processor PROCESSOR_1, among multiple processors including the first processor, determines to process read operations on logical address indicated by read commands.

Further, the method the method for operating the memory system 100 may include step S1320 in which the first processor PROCESSOR_1 processes a write operation on a logical address indicated by a write command.

Further, the method for operating the memory system 100 may include step S1330 in which the first processor PROCESSOR_1 selects the target logical address TARGET_LA among logical addresses indicated by the read command RD_CMD.

Further, the method for operating the memory system 100 may include step S1340 in which the second processor PROCESSOR_2, among the multiple processors, processes a read operation on the target logical address TARGET_LA selected at the step S1330.

Further, the method for operating the memory system 100 may include step S1350 in which the first processor PROCESSOR_1 searches for mapping information on a logical address corresponding to a read operation or a write operation to be processed by the first processor by using a first map search engine.

Further, the method for operating the memory system 100 may include step S1360 in which the second processor PROCESSOR_2 searches for mapping information on the target logical address by using a second map search engine.

As described above with reference to FIG. 5, the first processor PROCESSOR_1 may determine which among multiple processors is to process a read operation on a logical address indicated by the read command RD_CMD, and may process a write operation on a logical address indicated by a write command.

The first processor PROCESSOR_1 may search for mapping information on a logical address corresponding to a read operation or a write operation to be processed by the first processor PROCESSOR_1, by using the first map search engine MSE_1, and the second processor PROCESSOR_2 may search for mapping information on the target logical address TARGET_LA by using the second map search engine MSE_2.

The target logical address TARGET_LA may be 1) an odd logical address, 2) an even logical address or 3) a logical address indicated by the target read command TARGET_RD_CMD selected by the first processor PROCESSOR_1 among the read commands RD_CMD.

The first processor PROCESSOR_1 may process a read operation on a remaining logical address excluding the target logical address TARGET_LA. Alternatively, the first processor PROCESSOR_1 may control the separate third processor PROCESSOR_3 to process a read operation on a remaining logical address excluding the target logical address TARGET_LA.

When the second processor PROCESSOR_2 does not search for mapping information on the target logical address TARGET_LA, the second processor PROCESSOR_2 may request the first processor PROCESSOR_1 to load the mapping information on the target logical address TARGET_LA. After loading the mapping information on the target logical address TARGET_LA from the memory device 110, the first processor PROCESSOR_1 may transmit the mapping information on the target logical addresses TARGET_LA to the second processor PROCESSOR_2. And the mapping information on the odd target logical address TARGET_LA may be cached to the map cache MAP_CACHE by the first processor PROCESSOR_1.

The first processor PROCESSOR_1 may process a background operation for the memory device 110.

The above-described operation of the memory controller 120 may be controlled by the control circuit 123, and the processor 124 may be performed in a manner in which various operations of the memory controller 120 execute (drive) programmed firmware.

Figure 14:
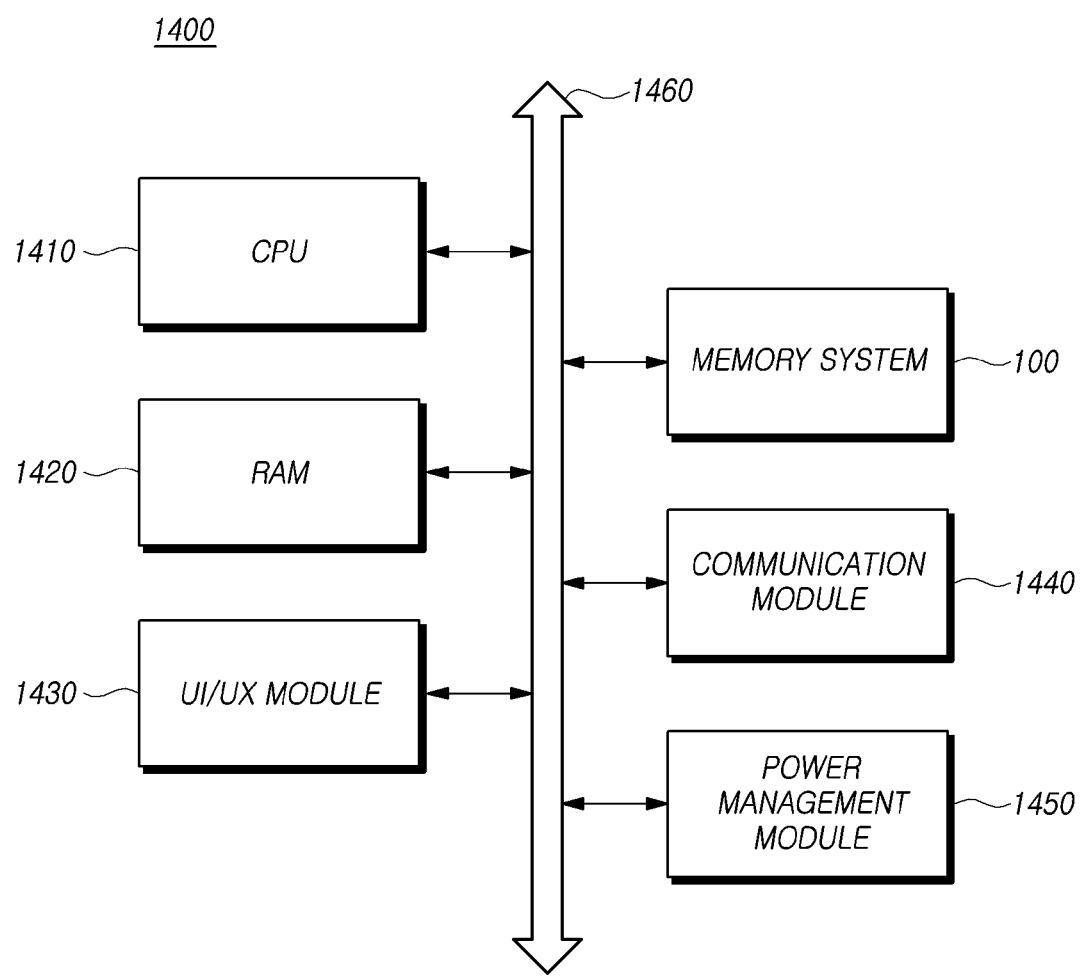
FIG. 14 is a diagram illustrating the configuration of a computing system according to an embodiment of the present invention disclosure.

FIG. 14 is a diagram illustrating the configuration of a computing system 1400 according to an embodiment of the present invention disclosure.

Referring to FIG. 14, the computing system 1400 may include: a memory system 100 electrically connected to a system bus 1460; a CPU 1410 configured to control overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device in a wired and/or wireless type; and a power management module 1450 configured to manage power used by the computing system 1400.

The computing system 1400 may be a personal computer (PC) or may include a mobile terminal such as a smartphone, a tablet or any of various other electronic devices.

The computing system 1400 may further include a battery for supplying an operating voltage, and may further include an application chipset, a graphic-related module, a camera image processor, and a DRAM. As those skilled in the art will understand, the computing system 1400 may include other elements as well.

The memory system 100 may be of a type configured to store data in a magnetic disk such as a hard disk drive (HDD), or a type configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and/or a ferroelectric RAM (FRAM). In addition, the memory system 100 may be implemented as any of various types of storage devices mounted inside any of various electronic devices.

According to embodiments of the present disclosure described above, operation delay time of the memory system may be minimized. In addition, according to an embodiment of the present disclosure, overhead occurring in the process of calling a specific function may be minimized.

Although various embodiments of the present disclosure have been illustrated and described, those skilled in the art will appreciate that various modifications, additions and substitutions are possible, without departing from the scope and spirit of the invention as set forth in the accompanying claims. That is, the present invention encompasses all modifications and variations of any of the disclosed embodiments that fall within the scope of the claims.

What is claimed is:

1. A memory system comprising:
   a memory device; and
   a memory controller configured to control the memory device,
   the memory controller comprising:
   a first processor configured to determine a processor, which is a target to process a read operation on a target logical address among logical addresses indicated by read commands, among multiple processors, in which the first processor is included, based on the target logical address, and process a write operation on a logical address indicated by a write command; and
   a second processor, among the multiple processors, configured to process the read operation on the target logical address selected by the first processor among the logical addresses indicated by the read commands,
   wherein the first processor searches for mapping information on a logical address corresponding to a read operation or a write operation to be processed by the first processor by using a first map search engine, and
   wherein the second processor searches for mapping information on the target logical address by using a second map search engine.

2. The memory system according to claim 1, wherein the target logical address is an odd logical address, an even logical address, or a logical address indicated by a target read command selected by the first processor among the read commands.

3. The memory system according to claim 2, wherein the first processor processes a read operation on a remaining logical address other than the target logical address.

4. The memory system according to claim 2, wherein the memory controller further comprises: a third processor, among the multiple processors, configured to process a read operation on a remaining logical address other than the target logical address.

5. The memory system according to claim 1, wherein, when the second processor does not search for the mapping information on the target logical address, the second processor requests the first processor to load the mapping information on the target logical address.

6. The memory system according to claim 5, wherein the first processor loads the mapping information on the target logical address from the memory device, and thereafter, transmits the mapping information on the target logical address to the second processor.

7. The memory system according to claim 1, wherein the first processor processes a background operation for the memory device.

8. A memory controller comprising:
   a memory interface configured to communicate with a memory device; and
   a control circuit configured to control the memory device,
   the control circuit comprising:
   a first processor configured to determine a processor, which is a target to process a read operation on a target logical address among logical addresses indicated by read commands, among multiple processors, in which the first processor is included, based on the target logical address, and process a write operation on a logical address indicated by a write command; and
   a second processor, among the multiple processors, configured to process a read operation on a target logical address selected by the first processor among the logical addresses indicated by the read commands,
   wherein the first processor searches for mapping information on a logical address corresponding to a read operation or a write operation to be processed by the first processor by using a first map search engine, and
   wherein the second processor searches for mapping information on the target logical address by using a second map search engine.

9. The memory controller according to claim 8, wherein the target logical address is an odd logical address, an even logical address, or a logical address indicated by a target read command selected by the first processor among the read commands.

10. The memory controller according to claim 9, wherein the first processor processes a read operation on a remaining logical address other than the target logical address.

11. The memory controller according to claim 9, wherein the control circuit further comprises: a third processor, among the multiple processors, configured to process a read operation on a remaining logical address other than the target logical address.

12. The memory controller according to claim 8, wherein, when the second processor does not search for the mapping information on the target logical address, the second processor requests the first processor to load the mapping information on the target logical address.

13. The memory controller according to claim 12, wherein the first processor loads the mapping information on the target logical address from the memory device, and thereafter, transmits the mapping information on the target logical address to the second processor.

14. The memory controller according to claim 8, wherein the first processor processes a background operation for the memory device.

15. A method for operating a memory system, comprising:
   determining, by a first processor, a processor, which is a target to process a read operation on a target logical address among logical addresses indicated by read commands, among multiple processors, in which the first processor is included, based on the target logical address;
   processing, by the first processor, a write operation on a logical address indicated by a write command;
   selecting, by the first processor, the target logical address among the logical addresses indicated by the read commands;
   processing, by a second processor, among the multiple processors, the read operation on the target logical address;
   searching, by the first processor, for mapping information on a logical address corresponding to a read operation or a write operation to be processed by the first processor by using a first map search engine; and
   searching, by the second processor, for mapping information on the target logical address by using a second map search engine.

16. The method according to claim 15, wherein the target logical address is an odd logical address, an even logical address, or a logical address indicated by a target read command selected by the first processor among the read commands.

17. The method according to claim 16, further comprising processing, by the first processor, a read operation on a remaining logical address other than the target logical address.

18. The method according to claim 15, further comprising requesting, by the second processor when the second processor does not search for the mapping information on the target logical address, the first processor to load the mapping information on the target logical address.

19. The method according to claim 18, further comprising:
    loading, by the first processor, the mapping information on the target logical address from the memory device; and
    transmitting, by the first processor, the mapping information on the target logical address to the second processor.

20. The method according to claim 15, further comprising processing, by the first processor, a background operation for the memory device.

\* \* \* \* \*